US009881088B1

(12) United States Patent
Leber

(10) Patent No.: US 9,881,088 B1
(45) Date of Patent: Jan. 30, 2018

(54) NATURAL LANGUAGE SOLUTION GENERATING DEVICES AND METHODS

(71) Applicant: Mike Leber, Fremont, CA (US)

(72) Inventor: Mike Leber, Fremont, CA (US)

(73) Assignee: Hurricane Electric LLC, Fremont, CA (US)

( * ) Notice: Subject to any disclaimer, the term of this patent is extended or adjusted under 35 U.S.C. 154(b) by 213 days.

(21) Appl. No.: 13/773,543

(22) Filed: Feb. 21, 2013

(51) Int. Cl.
*G06F 17/30* (2006.01)

(52) U.S. Cl.
CPC .............. *G06F 17/30864* (2013.01)

(58) Field of Classification Search
CPC ................................ G06F 17/30663
USPC .......................................... 707/706
See application file for complete search history.

(56) References Cited

U.S. PATENT DOCUMENTS

| 7,234,112 | B1* | 6/2007 | Brown ............. G06F 17/30433 715/255 |
| 7,310,635 | B2* | 12/2007 | Tucker ............. G06F 17/30522 |
| 8,725,756 | B1* | 5/2014 | Garg ............................. 707/750 |
| 8,976,197 | B1 | 3/2015 | Leber |
| 2001/0047270 | A1* | 11/2001 | Gusick ................ G06Q 30/016 705/1.1 |
| 2002/0023064 | A1 | 2/2002 | Grimse et al. |
| 2002/0023144 | A1* | 2/2002 | Linyard ................ G06F 9/4446 709/218 |
| 2002/0156866 | A1 | 10/2002 | Schneider |
| 2002/0196277 | A1 | 12/2002 | Bushey et al. |
| 2003/0158842 | A1* | 8/2003 | Levy ................. G06F 17/30445 |
| 2004/0044516 | A1* | 3/2004 | Kennewick et al. .............. 704/5 |
| 2005/0289124 | A1* | 12/2005 | Kaiser et al. ..................... 707/3 |
| 2006/0218117 | A1* | 9/2006 | Gupta ............................... 707/1 |
| 2007/0260601 | A1* | 11/2007 | Thompson ........ G06F 17/30867 |
| 2008/0294637 | A1 | 11/2008 | Liu |
| 2009/0083205 | A1 | 3/2009 | Dishongh et al. |
| 2009/0094200 | A1* | 4/2009 | Baeza-Yates ..... G06F 17/30902 |
| 2009/0197232 | A1 | 8/2009 | Couch et al. |
| 2010/0246784 | A1 | 9/2010 | Frazier et al. |
| 2012/0130978 | A1* | 5/2012 | Li et al. ........................ 707/706 |
| 2012/0197857 | A1 | 8/2012 | Huang et al. |
| 2012/0253836 | A1 | 10/2012 | Nolte et al. |
| 2013/0083063 | A1 | 4/2013 | Geisner et al. |
| 2013/0097664 | A1* | 4/2013 | Herz et al. ........................ 726/1 |

OTHER PUBLICATIONS

Final Office Action, dated Sep. 17, 2013, U.S. Appl. No. 13/773,529, filed Feb. 21, 2013.

(Continued)

*Primary Examiner* — Baoquoc N To
(74) *Attorney, Agent, or Firm* — Carr & Ferrell LLP

(57) ABSTRACT

Natural language solution generating devices and methods are provided herein. Exemplary devices may execute logic via one or more processors, which are programmed to receive a complex query in natural language format, the complex query including a real-world problem that requires interrogation of a plurality of information sources in order to ascertain a response to the problem, evaluate the complex query to determine query segments, which are each included with at least one domain, wherein a domain corresponds to an information source, query the information sources to obtain responses for the query segments, and generate a natural language solution using the responses.

9 Claims, 3 Drawing Sheets

(56) References Cited

OTHER PUBLICATIONS

"Visual Shelf Monitoring", http://web.archive.org/web/20120313094349/http://mathecys.com/visual-shelf-monitoring/ available since Mar. 13, 2012.
"The Millenium Problems", http://www,amazon.co.uk/The-Millenium-Problems-Greatest-Mathematical/dp/0465017304, available since 2003, only summary available on page.
Notice of Allowance, dated Dec. 12, 2014, U.S. Appl. No. 13/773,529, filed Feb. 21, 2013.

* cited by examiner

NATURAL LANGUAGE SOLUTION GENERATING DEVICES AND METHODS

FIELD OF THE PRESENT TECHNOLOGY

The present technology relates generally to providing solution generating devices and methods. Generally, the present technology may be configured to process natural language queries that include, for example, human interest driven questions. The present technology may interrogate a plurality of information sources in order to formulate a solution to these questions. Additionally, the present technology may provide explanations for the generated solutions, as well as methodologies utilized to arrive at such solutions.

BACKGROUND

Search engines and natural language processors are often used to fulfill a query. Unfortunately, these systems only provide one dimensional answers (e.g., interrogation of a single information source or a plurality of similar information sources) to queries. Thus, these systems are ill suited to providing answers to queries that require a more intricate interrogation of disparate types of information sources and/or multifaceted/multistep computations of data, as is often required when formulating responses to human interest driven (e.g., real-world) queries. For example, a business person may desire an answer to a complex query, such as, when is the best time to initiate marketing campaigns for a particular product in a variety of countries. This question inherently requires interrogation of a wide variety of information sources to formulate a coherent response or set of responses.

SUMMARY OF THE PRESENT TECHNOLOGY

According to some embodiments, the present technology may be directed to a system that comprises: (a) one or more processors; and (b) logic encoded in one or more tangible media for execution by the one or more processors and when executed operable to perform operations comprising: (a) receiving a complex query in natural language format, the complex query comprising a real-world problem that requires interrogation of a plurality of information sources in order to ascertain a response to the problem; (b) evaluating the complex query to determine one or more query segments, which are associated with at least one domain, wherein a domain further corresponds to one or more information sources; (c) querying the one or more information sources to obtain responses for the one or more query segments; and (d) generating a solution using the responses.

According to other embodiments, the present technology may be directed to a system that comprises: (a) one or more processors; and (b) logic encoded in one or more tangible media for execution by the one or more processors and when executed operable to perform operations comprising: (i) receiving a complex query in natural language format, the complex query comprising a real-world problem that requires interrogation of a plurality of information sources in order to ascertain a response to the problem; (ii) evaluating the complex query to determine one or more query segments, which are associated with at least one domain, wherein a domain further corresponds to one or more information sources; (iii) querying the one or more information sources to obtain responses for the one or more query segments; and (iv) generating a solution using the responses.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

Figure 1:
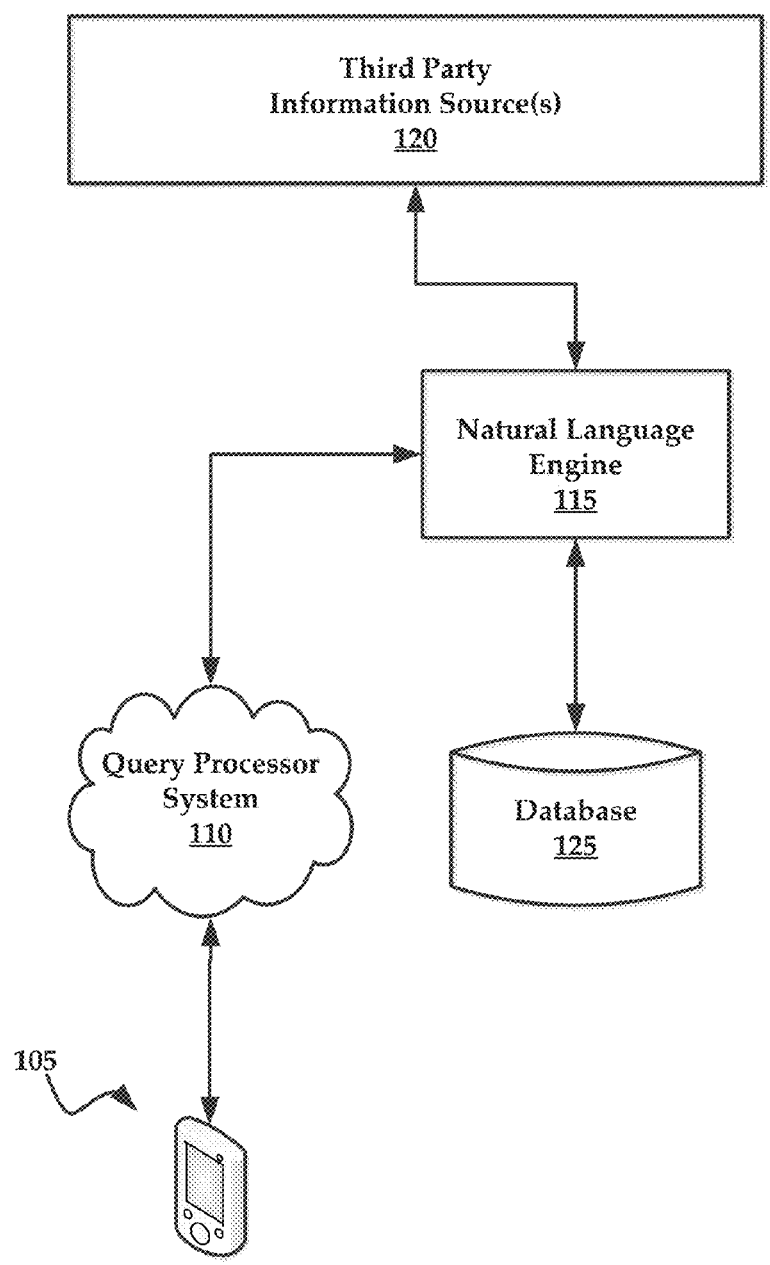
FIG. 1 is a block diagram of an exemplary architecture in which embodiments according to the present technology may be practiced.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the present technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

This present technology may focus on systems and methods that utilize oral or audio capture of complex, real-world problems in natural language formats. The present technology may utilize natural language query processing to deconstruct a complex problem into its constituent parts, allowing for the system to determine various domains to which the problem belongs. The domain(s) of the complex query may indicate the types of information sources that should be interrogated to provide a solution.

Stated otherwise, the present technology may be configured to provide solutions to human interest driven questions. These complex questions may require utilization of information from a plurality of sources to solve the problem. Additionally, while the present technology may be configured to execute very complex problem solving computations, the present technology may provide a user-friendly explanation of methods used to generate a solution, and/or the information sources used to craft the answer. In sum, the present technology may solve real-world problems, spoken as natural language queries.

FIG. 1 is a block diagram of an exemplary architecture in which embodiments according to the present technology may be practiced. The architecture is shown as comprising a client device 105, which may communicatively couple with a query processor system, hereinafter "system 110." The client device 105 may comprise any one of a number of devices such as a smartphone, a laptop, a tablet computer, or any other end user computing device that would be known to one of ordinary skill in the art with the present disclosure before them.

It will be understood that the components of the architecture may communicatively couple with one another over any one (or combination) of a variety of public or private communications media, such as any wired or wireless networks, including, but not limited to, a telecommunications network, a local area network, a private area network, or a public network, such as the Internet.

In some instances, the functions of the system 110 may be implemented within a cloud-based computing environment and may be referred to as a "server cloud." In general, a cloud-based computing environment is a resource that typically combines the computational power of a large model of processors and/or that combines the storage capacity of a large model of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of servers, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

According to some embodiments, the system 110 may comprise one or more processors and a memory for storing logic that is executable by the one or more processors to provide various features described herein. A more detailed description of the one or more processors and memory may be found with regard to the computing device 300 (also referred to as computing system 300 and system 300), of FIG. 3, which will be described in greater detail below.

Generally, the system 110 may execute logic stored in memory to receive a complex query in natural language format. In some instances, the complex query may comprise a real-world problem that requires interrogation of a plurality of information sources by the system 110 in order to ascertain a response to the problem. For example, the system 110 may receive a complex query in natural language format from the client device 105, such as when a user speaks a query into the client device 105. An exemplary complex query may include, "assemble a bill of materials for constructing a five thousand square foot office building, with a targeted price per square foot of two hundred dollars."

Initially, if the natural language query is spoken, the client device 105, or an application executing on the client device 105, may capture the spoken audio, which is passed to the natural language engine 115. The natural language engine 115 may transcribe the natural language query into a text-based input that is displayed to the end user. If the transcription is correct, the user may verify the veracity of the transcription, allowing the system 110 to proceed in generating a solution.

It will be understood that a complex query differs from a simple query inasmuch as a simple query is fulfilled by interrogating a single information source, such as a database, or a plurality of similar sources, such as multiple databases that include the same type of data. For example, a simple query may include, "will it rain today," "what is the price of gold," and so forth. Each of these simple queries may be answered by interrogating a single type of information source. In contrast, solving a complex query requires interrogation of a plurality of information sources, which in some instances encompass disparate types of information.

Upon receiving the complex query, the system 110 may utilize a natural language engine 115 to evaluate the complex query to determine query segments. That is, the natural language engine 115 may break down the natural language query into parts using, for example, keyword analysis, or other types of machine learning, such as semantics or heuristics. In some instances, the natural language engine 115 may determine a domain or domains for each query segment of the complex query. Using the example above, the natural language engine 115 may recognize keywords or phrases such as "constructing," "bill of materials," and "price per square foot" to determine that the complex query corresponds to a general domain of "construction." Each of these discernible phrases or sections of the query may itself be associated with a sub-domain or an entirely different domain.

For example, the natural language engine 115 may recognize the proximity of the word "assemble" to the phrase "bill of materials," allowing the natural language engine 115 to comprehend/determine that the user is requesting that the system 110 generate a bill of materials for a particular type of construction project.

While the system 110 and natural language engine 115 have been described as being separate systems, one of ordinary skill in the art will appreciate that the system 110 may comprise an integrated natural language engine 115. Solutions generated by the integrated natural language engine 115 may be stored in a database 125 and utilized to access previously generated solutions or to fine tune solutions over time, as information used by the system 110 as a predicate to a solution, changes or evolves.

In some instances, the system 110 may utilize the determined keywords, phrases, semantic logic, or other suitable machine learning techniques to determine a domain(s) or context for various segments of the complex query. Using the known domains, the system 110 may then interrogate or query a variety of third party information sources 120, as required.

Returning to the example above, the system 110 may determine that the following domains are implicated in the complex query: (a) construction related information such as building codes; (b) architecture; (c) tax and land records; (d) easements, covenants, and the like; and (e) material costs—just to name a few. Using these determined domains, the system 110 may interrogate the proper third party information sources 120, or may also interrogate the database 125 for solutions for similarly worded complex problems. In some instances, the system 110 may maintain an index that logically maps third party information sources 120 to various domains. If a plurality of domains are linked to a more generic domain, the system 110 may fine tune the selection of information sources by cross referencing other domains or content present in the complex query. For example, sub-domains of residential construction and commercial construction may belong generically to the domain of construction. Thus, the system 110 may fine tune the selection of information sources by determining if the complex query is related to residential or commercial construction, by examining the complex query for keywords such as "home" or "business."

Using information gathered from the diversity of third party information sources 120, the system 110 may compute a solution to the complex query. In other instances, the response may be provided to the end user in the form of a report or, in accordance with the example, a proposed bill of materials. Indeed, the "solution" to a complex query may comprise a complex response that includes multiple reports or solutions that are combined together by the system 110 into a cohesive answer.

Once the solution has been generated, the system 110 may pass the solution to the natural language engine 115 for translation into a natural language response. The natural language response may include an audible response that can be output via a peripheral device of the client device 105.

In addition to providing a solution to the complex query, the system 110 may also provide ancillary problem/solution information. For example, the system 110 may describe the third party information sources 120 that were interrogated, or the steps used by the system 110 to solve the complex query.

In some instances, the logic executed by the system 110 is further operable to perform operations such as storing a complex problem and solution pair in the database 125. Advantageously, instead of generating solutions for problems that have already been solved, the system 110 may initially query the database 125 for a corresponding problem/solution pair. In these instances, the system 110 may query the database 125 for a complex problem that is sufficiently similar to the complex query at issue. The system 110 may request that the user confirm that the selected query/solution pair is sufficiently similar. Similar query/solution pairs may be utilized by the end user to determine how a particular problem has been solved by the system 110 in the past.

If a problem is associated with multiple independent or differing solutions, the system 110 may provide one or more of the solutions, allowing the user to choose the best or most suitable solution.

In some instances, the system 110 may determine if the problem either unsolvable or has an incomplete solution. Again, this information may be determined by attempting to solve the problem or by querying the database to find a similar problem. If it is determined that there is an incomplete solution for the problem or that the problem is unsolvable, the system 110 may generate and cause the display of a warning message to the user, such as "Warning: Incomplete Solution or Problem Unsolvable."

In addition to the other ancillary types of information provided in response to a problem, the system 110 may determine a field of endeavor associated with the problem. For example, the system 110 may determine that a particular complex word problem that is mathematical in nature is unique to fluid dynamics or aerospace engineering. This information may be valuable to the user and thus may be displayed to the user.

In some instances, the system 110 may determine that an economic value is associated with the problem. For example, the system 110 may determine that someone has offered a reward to complete a particular problem. The system 110 may display descriptive information about the economic value for the problem to the user.

The system 110 may also query the database(s) 125 to determine how often a particular complex query has been processed and/or solved (e.g., a frequency of occurrence of the complex query). The system 110 may also generate various scores for the complex query at hand, such as determining a complexity score that represents a complexity level for the complex query. A resource score may also be calculated that represents an amount of resources required to complete the complex query. This resource score may refer, for example, to an amount of computing resources that the system 110 is required to dedicate to solving the problem, or duration of the use of said resources.

Figure 2:
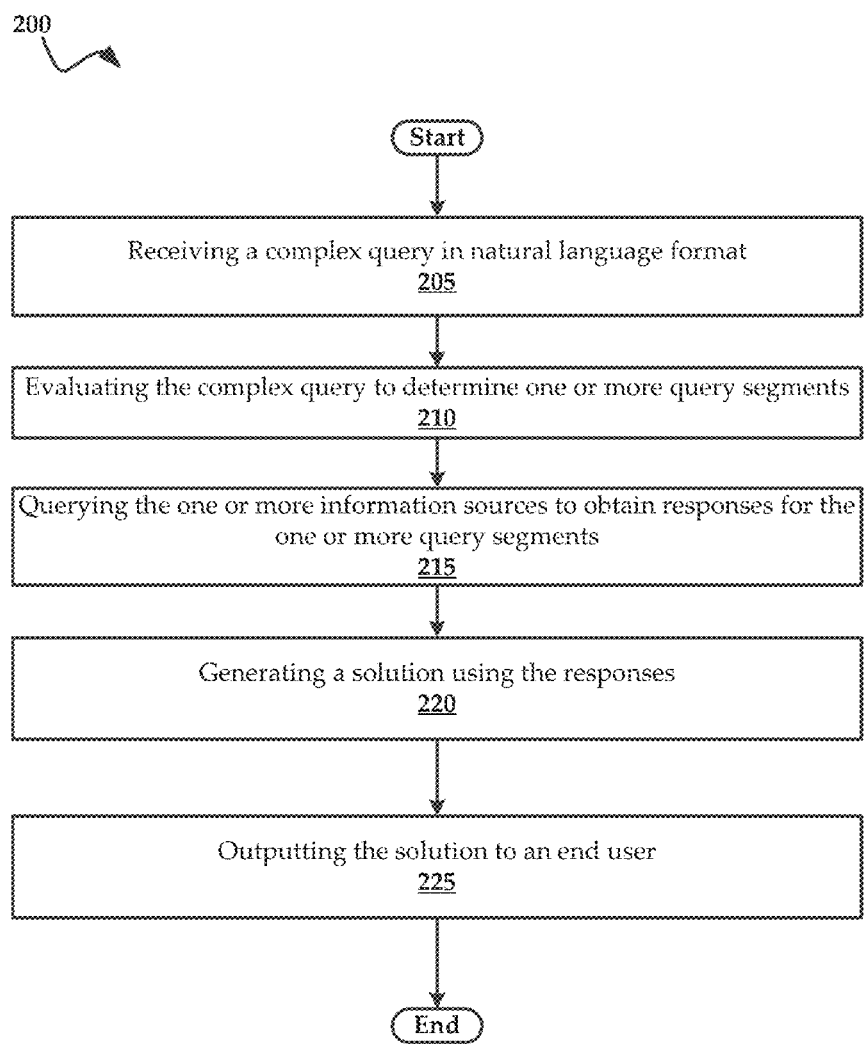
FIG. 2 is a flowchart of an exemplary method for generating a solution to a complex query.

FIG. 2 is a flowchart of an exemplary method 200 for generating a solution to a complex query. Generally, the method may include a step 205 of receiving a complex query in natural language format. The complex query may include an oral query received by a client device, or may include a text-based natural language query. The text-based query may be a transcription of an oral query received by the client device, or may include a typed query input by a user of the client device.

As mentioned previously, the complex query comprises, for example, a real-world problem that requires interrogation of a plurality of information sources in order to ascertain a response to the problem.

The method may also include a step 210 of evaluating the complex query to determine one or more query segments. That is, the method may include separating the complex query into query segments using keyword or semantic analysis. For example, a complex query may be separated into distinct segments, if the complex query comprises segments that are drawn to sufficiently divergent domains, such as a complex financial services query that includes segments such as commodity pricing and weather forecasting.

Again, each of the segments may be associated with at least one domain and a domain further corresponds to one or more information sources. Thus, a segment that corresponds to the weather forecasting domain may, in turn, be associated with a database of weather information. In sum, the domains of query segments may be directly associated with third party information sources, via a domain(s).

When appropriate third party information sources have been identified, the method may include a step 215 of querying the one or more information sources to obtain responses for the one or more query segments. Next, the method may include a step 220 of generating a solution using the responses. According to some embodiments, the solution may be generated by combining together the responses gathered from the various third party information sources. The step 220 of generating a solution may include more processing of the responses, above and beyond the mere integration of the responses into a coherent format. In some instances, the method may utilize a semantic and/or heuristic processing of the individual responses in order to generate an understandable solution to the complex query. As mentioned previously, the solution may include a plurality of solutions, or the generation of a report or set of reports, the content thereof depending upon the complexity or nature of the query.

The method may include combining the responses together to create a natural language solution, which is output to the end user, via a client device. Thus, the method may include an optional step 225 of outputting the solution to the end user.

Figure 3:
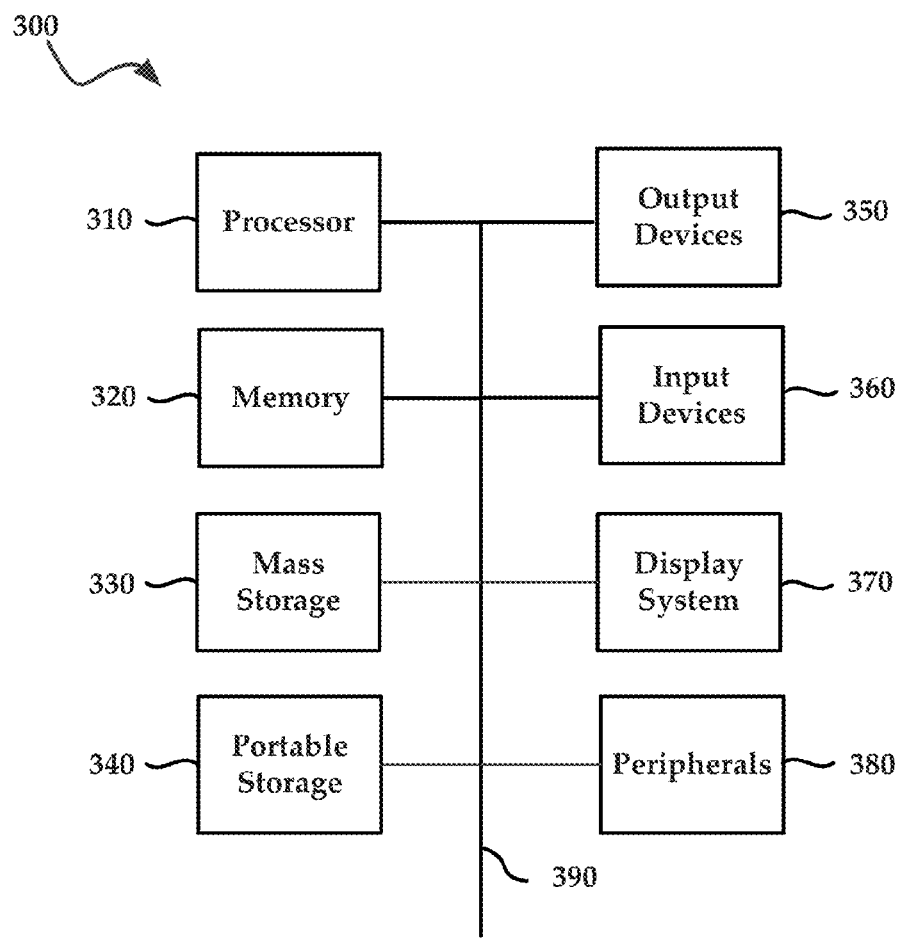
FIG. 3 illustrates an exemplary computing device that may be used to implement embodiments according to the present technology.

FIG. 3 illustrates an exemplary computing device 300 that may be used to implement an embodiment of the present systems and methods. The system 300 of FIG. 3 may be implemented in the contexts of the likes of computing devices, networks, servers, or combinations thereof. The computing device 300 of FIG. 3 includes one or more processors 310 and main memory 320. Main memory 320 stores, in part, instructions and data for execution by processor 310. Main memory 320 may store the executable code when in operation. The system 300 of FIG. 3 further includes a mass storage device 330, portable storage device 340, output devices 350, user input devices 360, a display system 370, and peripheral devices 380.

The components shown in FIG. 3 are depicted as being connected via a single bus 390. The components may be connected through one or more data transport means. Processor unit 310 and main memory 320 may be connected via a local microprocessor bus, and the mass storage device 330, peripheral device(s) 380, portable storage device 340, and display system 370 may be connected via one or more input/output (I/O) buses.

Mass storage device 330, which may be implemented with a magnetic disk drive or an optical disk drive, is a non-volatile storage device for storing data and instructions for use by processor unit 310. Mass storage device 330 may store the system software for implementing embodiments of the present technology for purposes of loading that software into main memory 320.

Portable storage device 340 operates in conjunction with a portable non-volatile storage medium, such as a floppy disk, compact disk, digital video disc, or USB storage device, to input and output data and code to and from the computer system 300 of FIG. 3. The system software for implementing embodiments of the present technology may be stored on such a portable medium and input to the computing system 300 via the portable storage device 340.

User input devices 360 provide a portion of a user interface. User input devices 360 may include an alphanumeric keypad, such as a keyboard, for inputting alphanumeric and other information, or a pointing device, such as a mouse, a trackball, stylus, or cursor direction keys. Additional user input devices 360 may comprise, but are not limited to, devices such as speech recognition systems, facial recognition systems, motion-based input systems, gesture-based systems, and so forth. For example, user input devices 360 may include a touchscreen. Additionally, the system 300 as shown in FIG. 3 includes output devices 350. Suitable output devices include speakers, printers, network interfaces, and monitors.

Display system 370 may include a liquid crystal display (LCD) or other suitable display device. Display system 370 receives textual and graphical information, and processes the information for output to the display device.

Peripherals device(s) 380 may include any type of computer support device to add additional functionality to the computer system. Peripheral device(s) 380 may include a modem or a router.

The components provided in the computer system 300 of FIG. 3 are those typically found in computer systems that may be suitable for use with embodiments of the present technology and are intended to represent a broad category of such computer components that are well known in the art. Thus, the computer system 300 of FIG. 3 may be a personal computer, hand held computing device, telephone, mobile computing device, workstation, server, minicomputer, mainframe computer, or any other computing device. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A system, comprising:
   one or more processors; and
   logic encoded in one or more tangible media for execution by the one or more processors and when executed operable to perform operations comprising:
   receiving a complex query in natural language format, the complex query comprising a real-world problem that requires interrogation of a plurality of information sources in order to ascertain a response to the problem;
   separating the complex query into a plurality of query segments, each of the plurality of query segments being associated with a unique domain, wherein a domain further corresponds to a plurality of information sources;
   generating a resource score that represents an amount of resources required to generate a solution to the complex query and a complexity score that represents a complexity level for the complex query, the complexity score being related to a number of query segments of the complex query, wherein the resource score is an amount of computing resources that are required to be dedicated to solving the problem, or duration of use of said computing resources;
   outputting both the resource and the complexity scores;
   querying a database for similarly worded complex problems using the plurality of query segments;
   determining query and solution pairs of the similarly worded complex problems in the database;
   providing the query and solution pairs to a requestor;
   receiving confirmation from the requestor that at least one of the similar query and solution pairs corresponds to the complex query; and
   generating a solution that comprises the at least one of the similar query and solution pairs.

2. The system according to claim 1, wherein the logic when executed is further operable to perform operations comprising outputting the solution in a natural language format.

3. The system according to claim 1, wherein the logic when executed is further operable to perform operations comprising outputting an audible explanation of one or more processes used to generate the solution.

4. The system according to claim 1, wherein the logic when executed is further operable to perform operations comprising storing a complex query and solution pair in a database, the complex query and solution pair comprising the problem and a natural language solution for the complex query.

5. The system according to claim 1, wherein generating a solution comprises determining if the complex query is any of unsolvable and has an incomplete solution, wherein if the complex query is any of unsolvable and has an incomplete solution, a warning message is output in an audible format.

6. The system according to claim 1, wherein the logic when executed is further operable to perform operations comprising determining an economic value associated with the solution to the complex query; and outputting the economic value.

7. The system according to claim 1, wherein the logic when executed is further operable to perform operations comprising determining a frequency of occurrence of the complex query.

8. The system according to claim 1, wherein the logic when executed is further operable to perform operations comprising providing one or more steps required to generate the solution to the complex query in a format that can be displayed on a display device.

9. The system according to claim 1, wherein the logic when executed is further operable to perform operations comprising identifying a field of endeavor of the complex query.

* * * * *